3,210,379
EPOXIDE COMPOUNDS
Daniel Porret, Basel, Switzerland, assignor to Ciba Limited, Basel, Switzerland
No Drawing. Original application July 25, 1960, Ser. No. 44,854. Divided and this application Jan. 16, 1962, Ser. No. 166,677
Claims priority, application Switzerland, Aug. 13, 1959, 76,914; Mar. 9, 1960, 2,699/60
1 Claim. (Cl. 260—348)

This application is a division of my application Serial No. 44,854 filed July 25, 1960, and now abandoned.

The present invention provides new epoxide compounds of the formula $$\underset{R_1}{\overset{O}{\underset{|}{CH}}}\text{---}\underset{R_2}{\overset{}{\underset{|}{C}}}\text{---}CH_2\text{---}O\text{---}\left[\text{---}CH\underset{\underset{CH}{|}}{\overset{\overset{CH}{|}}{\underset{|}{\overset{|}{CH_2}}}}\overset{CH\text{---}CH}{\underset{CH\quad CH_2}{\diagdown\diagup}}\overset{}{\underset{}{\diagdown O\diagup}}\right]_{n-1}\text{H} \quad (I)$$

in which $R_1$ and $R_2$ represent methyl groups or preferably hydrogen atoms and $n=1$ or 2.

The monoepoxides of the Formula I [$n=1$]—whose cyclopentene ring contains a carbon-to-carbon double bond—constitute at room temperature pale-colored liquids of low viscosity which are valuable active diluents for epoxy resins.

The diepoxides of the Formula I [$n=2$] are substantially colorless resins which are viscous at room temperature and can be cured with the conventional curing agents for epoxy resins to form infusible resins having very valuable industrial properties.

The epoxide compounds of the Formula I are obtained according to the present invention when, in any desired order of succession, in a compound of the formula $$\text{HO---}\left[\underset{R_1}{\overset{}{\underset{|}{CH}}}\text{---}\underset{R_2}{\overset{}{\underset{|}{C}}}\text{---}CH_2\text{---}O\text{---}\right]\left[\text{---}CH\underset{\underset{CH}{|}}{\overset{\overset{CH}{|}}{\underset{|}{\overset{|}{CH_2}}}}\overset{CH\text{---}CH}{\underset{CH\quad CH_2}{\diagdown\diagup}}\right]\text{H} \quad \text{---Hal} \quad (II)$$

in which $R_1$ and $R_2$ have the same meaning as in Formula I and Hal represents a halogen atom such as chlorine or bromine—the halogenohydrin group is converted by treatment with a dehydrohalogenating agent into the corresponding 1:2-epoxide group and, if the cyclopentene ring contains a carbon-to-carbon double bond, the latter is epoxidized by treatment with an epoxidizing agent.

As dehydrohalogenating agent for converting the halogenohydrin group into an epoxide group there is particularly suitable a strong alkali, for example potassium hydroxide or sodium hydroxide.

When the carbon-to-carbon double bond in the cyclopentene ring is to be epoxidized, this is preferably carried out with an organic per-acid such as peracetic acid, perbenzoic acid, peradipic acid, monoperphthalic acid or the like. An alternative epoxidizing agent is hypochlorous acid, whereby in the first stage HOCl is added on to the double bond and in a second stage the epoxide group is formed by the action of an agent capable of splitting off hydrochloric acid, for example a strong alkali.

The starting materials of the Formula II are easy to prepare, either (1) By an additive reaction of a monohalohydrin of the formula $$\left[CH_2OH\text{---}CR_2\text{---}CHR_1\right]\genfrac{}{}{0pt}{}{\text{---OH}}{\text{---Hal}}$$

where Hal represents a halogen atom, for example bromine or chlorine—with dicyclopentadiene in the presence of an acid catalyst or of a Lewis acid such as sulfuric acid or boron fluoride or a boron fluoride complex; or (2) By condensing an epihalohydrin of the formula $$CH_2Hal\text{---}\underset{\diagdown O\diagup}{CR_2\text{---}CHR_1}$$

with dihydrodicyclopentadiene 8-ol.

As examples of monochlorohydrins suitable as starting materials for use in process (1) there may be mentioned α-methylglycerol-α-monochlorohydrin, β-methylglycerol-α-monochlorohydrin, glycerol-β-monochlorohydrin, glycerol-α-bromohydrin and above all glycerol-α-monochlorohydrin. Likewise suitable are mixtures of such monochlorohydrins such as, for example, as the commercial mixture of glycerol-β-monochlorohydrin and glycerol-α-monochlorohydrin.

As examples of epihalohydrins suitable for use in process (2) there may be mentioned epibromohydrin and more especially epichlorohydrin.

Process (1) furnishes mixtures of α- and β-monohalohydrin ethers, while process (2) yields α-monohalohydrin ether in a practically quantitative yield.

Alternatively, the present process may be performed, if desired, by treating the mixture of isomers obtained by process (1) with a dehydrohalogenating agent without separating it, but in this case only the α-monochlorohydrin ether share is converted into the epoxyalkyl ether.

When the last-mentioned reaction is followed by epoxidation of the carbon-to-carbon double bond there are obtained as by-products also monoepoxide compounds of the formula $$\underset{CH_2OH}{\overset{Hal}{\underset{|}{\underset{R_2\text{---}C\text{---}O}{\overset{R_1\text{---}CH}{|}}}}}\left[\text{---}CH\underset{\underset{CH}{|}}{\overset{\overset{CH}{|}}{\underset{|}{\overset{|}{CH_2}}}}\overset{CH\text{---}CH}{\underset{CH\quad CH_2}{\diagdown\diagup}}\overset{}{\underset{}{\diagdown O\diagup}}\right] \quad (III)$$

Furthermore, if a treatment with an epoxidizing agent is carried out there may be formed in addition to the diepoxides also wholly or only partially hydrolyzed epoxides resulting from side reactions, that is to say compounds in which the epoxide groups of the diepoxide of the Formula I have been wholly or partially hydrolyzed to hydroxyl groups.

It has been observed that in general the presence of such by-products has a beneficial effect on the industrial properties of the cured diepoxides. In general it is, therefore, of advantage not to isolate the pure diepoxides from the reaction mixture.

Initially the exact chemical constitution of the starting compounds of the Formula II was somewhat doubtful (see U.S. Patent No. 2,375,768 of May 15, 1945, to Herman A. Bruson, Philadelphia, which first disclosed a process for the manufacture of the unsaturated monochlorohydrin ethers of dihydrodicyclopentadiene). In the meantime it has been established by exact research work that these ethers have the structure represented by the Formula II and that the chlorohydrin radical is most probably in the 8-position of the dihydrodicyclopentadiene skeleton (see U.S. Patent No. 2,543,419 of February 27, 1951, to Warren O. Niederhauser, Philadelphia).

As has been mentioned above the diepoxide compounds of the present invention can be cured with the conventional curing agents for epoxide compounds. In admixture with such curing agents they can thus be cross-linked or cured in the same manner as other polyfunctional epoxide compounds or epoxy resins. As such curing agents there may be used basic compounds or more especially acidic compounds. The following have been found suitable: Amines or amides, such as aliphatic and aromatic primary, secondary and tertiary amines, for example mono-, di- and tributylamines, para-phenylenediamine, bis-[para-aminophenyl]-methane, ethylenediamine, N:N-diethyl-ethylenediamine, tetra-[hydroxyethyl]-diethylenetriamine, diethylenetriamine, triethylenetetramine, tetraethylenepentamine, piperidine, piperazine, guanidine and guanidine derivatives such as phenyldiguanidine, diphenylguanidine, dicyandiamide, aniline-formaldehyde resins, urea-formaldehyde resins, melamine-formaldehyde resins, polymers of aminostyrenes; polyamides, for example polyamides of aliphatic polyamines with dimerized or trimerized unsaturated fatty acids, isocyanates, isothiocyanates; polyhydric phenols, for example resorcinol, hydroquinone, quinone, phenolaldehyde resins, oil-modified phenolaldehyde resins; reaction products of aluminum alcoholates or phenolates with compounds of tautomeric reaction of the type of acetoacetic ester, Friedel-Crafts catalysts such as aluminum chloride, antimony chloride, stannic chloride, ferric chloride, zinc chloride, boron trifluoride and complexes thereof with organic compounds; phosphoric acid.

Preferred curing agents are polybasic carboxylic acids and anhydrides thereof, for example phthalic anhydride, methylendomethylene tetrahydrophthalic anhydride or endomethylene tetrahydrophthalic anhydride or mixtures thereof; maleic or succinic anhydride, and if desired there may also be added an accelerator such as a tertiary amine and advantageously a polyhydroxy compound such as hexanetriol.

The term "curing" as used above signifies the conversion of the aforementioned epoxide compounds into insoluble and infusible resins. Accordingly, the present invention includes also curable mixtures containing the new diepoxides of the Formula I as well as curing agents for epoxy resins, more especially di- or polycarboxylic acid anhydrides. The curable mixtures of the present invention may advantageously further contain a proportion of otherwise appropriate diepoxides whose epoxide groups, however, are wholly or partially hydrolyzed to hydroxyl groups, and/or polyhydroxy compounds such as hexanetriol, and as active diluent monoepoxides, such, for example, as cresyl glycide or the abovementioned monoepoxides of the Formula I or III.

It is, of course, also possible to add to the curable epoxide compound further polyepoxides such, for example, as mono- or polyglycidyl ethers of mono- or polyalcohols, such as butanol, 1:4 butanediol or glycerol or of mono- or polyphenols, such as resorcinol, bis-[4-hydroxyphenyl]-dimethylmethane or condensation products of aldehydes with phenols (novolaks); furthermore polyglycidyl esters of polycarboxylic acids such as phthalic acid, and also aminopolyepoxides such as are obtained, for example, by dehydrohalogenating a reaction product of an epihalohydrin with a primary or secondary amine, such as n-butylamine, aniline or 4:4'-di[monomethylamino]-diphenylmethane.

Furthermore, the properties of such known polyepoxides can be modified in a valuable manner by adding a monoepoxide of the Formula I as active diluent.

The epoxide compounds as well as their mixtures with curing agents and possibly other epoxy resins can be mixed at any phase prior to the curing with fillers, plasticizers, coloring materials or the like. Examples of suitable extenders and fillers are asphalt, bitumen, glass fibers, mica, quartz meal, cellulose, kaolin, finely dispersed silicic acid (Aerosil), or metal powders.

The mixtures containing the diepoxide compound of the invention and a curing agent can be used with or without a filler, as well as in the form of solutions or emulsions as textile assistants, laminating resins, lacquers, paints, dipping resins, casting resins, coating compositions, pore fillers and putties, adhesives or the like as well as for the manufacture of such products. The new resins are particularly valuable as insulating compounds for electrical purposes.

In the following examples parts and percentages are by weight, the relationship between part by weight and part by volume being the same as that between the kilogram and the liter.

EXAMPLE 1

(1) *Adding α-monochlorohydrin on to dicyclopentadiene*

324 parts of dicyclopentadiene are mixed with 540 parts of α-monochlorohydrin and 5 parts by volume of a solution of 40% strength of boron trifluoride in diethyl ether. The mixture is slowly heated to 75° C., whereupon an exothermic reaction sets in which lasts for one hour. During this period and then for another 2 hours the temperature is maintained at 70–75° C. The reaction mixture is then allowed to cool, treated with 6 parts of anhydrous sodium carbonate and finally subjected to fractional distillation under a vacuum of 0.12 to 0.15 mm. Hg pressure. There are obtained:

| At ° C. | Under mm. Hg | |
|---|---|---|
| 30 | 0.15 | 5 parts of dicyclopentadiene |
| 75 | 0.12 | 301 parts of glycerol-α-monochlorohydrin |
| 130 | 0.15 | 431 parts of adduct (a) |
| | | 111 parts of residue. |

The yield amounts to 82% of the theoretical, calculated on α-monochlorohydrin.

A second batch was reacted in the same manner without separating the adduct (a) and the residue. This intact crude product is hereinafter referrred to as adduct (b).

(2) *Epoxidation*

When 243 parts of adduct (a) and (b) respectively are mixed with 600 parts by volume of benzene, 206 parts of peracetic acid of 41% strength and 12 parts of sodium acetate are mixed, an exothermic reaction sets in which lasts for 3 hours; during this time the temperature is maintained at 30–32° C., the whole is stirred for another hour, the solution is then washed twice with 200 parts by volume of water on each occasion and the benzene is then completely distilled off, to leave 264 parts of epoxidized adduct (a') and (b') respectively.

(3) *Dehydrochlorination*

264 parts each of epoxidation product (a') and (b') respectively are treated for one hour at 50° C. with 135 parts of aqueous sodium hydroxide solution of 30.6% strength. 500 parts by volume of benzene are then added and the sodium chloride formed is filtered off. The benzene layer is then separated and the aqueous bottom layer is washed twice with 50 parts by volume of benzene on each occasion. The benzene solutions are combined and evaporated to yield 220 parts of a viscous colorless epoxy resin (A) and (B) respectively containing 6.25 and 6.2 epoxide equivalents per kilogram respectively.

The epoxy resin (A) consists predominantly of a diepoxide compound of the formula

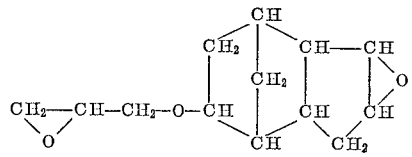

*Example 2*

100 parts each of epoxy resins A and B prepared as described in Example 1 are fused at 120° with 71 parts and 68.8 parts respectively of phthalic anhydride as curing agent, using in each case 0.75 equivalent of anhydride groups per equivalent of epoxide groups of the resin.

The mixtures are cured in an aluminum mould (40 x 10 x 140 mm.) for 24 hours at 140° C. The properties of the cured castings are shown in the following table.

| Epoxy resin | Impact bending strength, cm./kg./cm.² | Bending strength, kg./mm.² | Thermal stability according to Martens DIN,° C. | Water absorbed after 4 days at 20° C. |
|---|---|---|---|---|
| A | 6.5 | 8.2 | 130 | 0.28 |
| B | 12.8 | 8.8 | 145 | |

*Example 3*

The epoxy resin A described in Example 1 can alternatively be prepared in the following manner:

(1) *Condensation of epichlorohydrin with 8-hydroxy-dihydrodicyclopentadiene*

300 parts of 8-hydroxy-dihydrodicyclopentadiene are heated to 75° C., 2 parts of boron trifluoride etherate of 40% strength are added and in the course of 20 minutes 203 parts of epichlorohydrin are dropped into the mixture. The reaction sets in immediately and a substantial amount of heat is evolved; by cooling the reaction temperature it is maintained at 80–85° C. On completion of the dropwise addition of epichlorohydrin the evolution of heat ceases and the mixture is stirred on for 20 minutes while being heated at 80° C. At this stage no free epicholorhydrin can be detected in the reaction mixture. There are obtained in this manner 505 parts of a dark, viscous liquid consisting predominantly of the compound of the formula

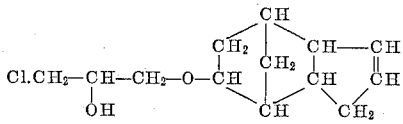

When instead of boron trifluoride etherate an equal amount of stannic chloride is used as catalyst, all other reaction conditions being identical, the identical product is obtained.

(2) *Epoxidation of chlorohydrin*

503 parts of the chlorohydrin described above are treated with 1360 parts by volume of benzene and 23 parts of sodium acetate. While stirring vigorously and cooling moderately 464 parts of a solution of 36.1% strength of peracetic acid in acetic acid are added dropwise within 30 minutes while maintaining the temperature at 33–35° C. One hour after addition of the peracetic acid the evolution of heat ceases and the temperature begins to drop. After another 45 minutes the reaction mixture is cooled and analysis of a sample of the product reveals that at this stage 98% of the theoretical amount of peracetic acid have been consumed. The aqueous phase is then separated, the benzene layer is washed three times with 450 parts by volume of water on each occasion, then once again with 200 c.c. of water containing 35 parts of sodium hydroxide solution of 30% strength while at the same time neutralizing the residual acetic acid, and finally it is washed with 250 parts by volume of water. The benzene and any residual water are then evaporated under a partial vacuum, and finally the last remnants of volatile constituents are expelled at an internal temperature up to 80° C. under a pressure of 0.2 mm. Hg.

There are obtained in this manner 485 parts of epoxidized chlorohydrin of the formula

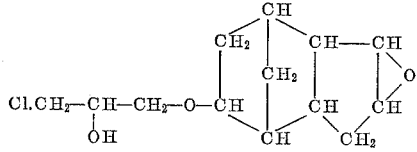

in the form of a yellow liquid having an epoxide content of 3.38 equivalents per kilogram, corresponding to 87.5% of the theoretical.

(3) *Dehydrochlorination of the epoxidized chlorohydrin*

475 parts of the epoxidized chlorohydrin described above under (2) are vigorously stirred with 524 parts of sodium hydroxide solution of 30.2% strength for 90 minutes at 55° C. The mixture is then treated with 1000 parts by volume of benzene, cooled, the precipitated sodium chloride is suctioned off and the aqueous phase is separated. The benzene layer is separated under a partial vacuum from the solvent and then under a pressure of 0.2 mm. Hg at an internal temperature of 105° C. from the last remnants of volatile constituents. There are obtained 405 parts of the epoxidized glycidyl ether (epoxy resin A) of the formula

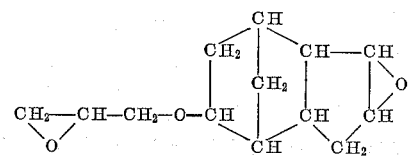

in the form of a dark-brown liquid containing 7.44 epoxide equivalents per kilogram, corresponding to 82.5% of the theoretical. The product no longer contains any hydrolyzable chlorine.

When the order in which the operations 2 and 3 have been carried out above is reversed, that is to say when the dehydrochlorination is carried out first and the epoxidation after, the identical final product is obtained.

When the dehydrochlorination is carried out but not the epoxidation, the corresponding glycidyl ether is obtained which may be used as active diluent and which is described below.

EXAMPLE 4

*Dehydrochlorination of the chlorohydrin obtained as described in paragraph 1 of Example 3*

250 parts of the unsaturated chlorohydrin described in Example 3 under (1) are stirred for 75 minutes with 262 parts of sodium hydroxide solution of 30.2% strength at 58° C. 500 parts by volume of benzene are then added, the whole is cooled, the precipitated sodium chloride is suctioned off and the aqueous phase is separated. The benzene layer is washed with 100 parts by volume of water and then freed from benzene under a partial vacuum. Finally the last remnant of solvent is expelled at an internal temperature of 100° C. under a pressure of 0.15 mm. Hg. In this manner there are obtained 200 parts of glycidyl ether of the formula

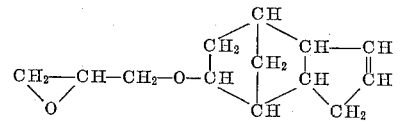

in the form of a pale-brown, mobile liquid containing 3.82 epoxide equivalents per kilogram.

EXAMPLE 5

Test 1 is carried out with a cycloaliphatic diepoxide compound of the formula

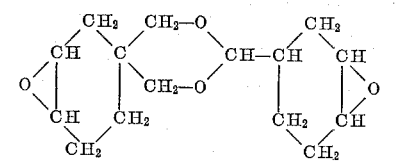

containing 6.08 epoxide equivalents per kilogram (prepared by epoxidizing the acetal from Δ³-tetrahydrobenzaldehyde and 1:1-bis-[hydroxymethyl]-cyclohexene-3 with peracetic acid) and Test 2 with a mixture consisting of 80 parts of the above-mentioned cycloaliphatic diepoxide and 20 parts of the unsaturated glycidyl ether described in Example 4 containing 3.8 epoxide equivalents per kilogram. In both tests there are fused in as curing catalyst 0.65 equivalent of phthalic anhydride per equivalent of epoxide groups at 120–125° C.

The resulting casting resin mixtures are poured at about 120° C. into aluminum moulds (40 x 10 x 140 mm.) and cured for 24 hours at 140° C. As will be seen from the following table the addition of a glycidyl ether according to the invention (Test 2) reduces the viscosity considerably and the properties of the cured casting are improved.

| Test | Viscosity of resin or resin mixture at 23° C. in centipoises | Impact bending strength, cm./kg./cm.² | Bending strength, kg./mm.² | Thermal stability according to Martens DIN,° C. |
| --- | --- | --- | --- | --- |
| 1 | >200,000 | 4.3 | 4.0 | 158 |
| 2 | 47,000 | 5.6 | 5.4 | 184 |

EXAMPLE 6

(1) *Addition of β-methylglycerol-α-monochlorohydrin on to dicyclopentadiene*

A mixture of 33 parts of dicyclopentadiene and 31 parts of 1-chloro-2-methyl-2:3-dihydroxypropane is heated to 85° C. 0.2 part of sulfuric acid of 98% strength is then added, whereupon the temperature rises slightly. The mixture is kept for 6 hours at 85–90° C. and 0.5 part of sodium carbonate is then added. The unreacted products are distilled under a high vacuum, whereupon 7 parts thereof pass over at 34° C. under 0.2 mm. Hg and 8 parts thereof at 60° C. under 0.2 mm. Hg. The residue, 48 parts, is the chlorohydrin of the formula

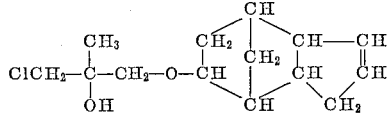

in the form of a viscous, dark liquid.

(2) *Epoxidation*

A solution of 47 parts of the chlorohydrin described above in 150 parts of benzene is treated with 3 parts of sodium acetate and the whole is heated to 35° C. 36 parts of peracetic acid of 42.9% strength are then added and the temperature is maintained for 2 hours at about 35° C. The product is then washed four times with 40 parts of water. During the last washing the product is neutralized with 1.5 parts of sodium hydroxide solution of 30% strength. The whole is then concentrated first under a partial vacuum and then under a pressure of 0.2 mm. Hg at a temperature up to 110° C., to yield 35 parts of an orange-colored oil containing 3.08 epoxide equivalents per kilogram.

(3) *Dehydrochlorination of the epoxidized chlorohydrin*

33.5 parts of the epoxidized product described under (2) above are stirred for one hour with 163 parts of sodium hydroxide solution of 30.2% strength. 100 parts by volume of benzene are then added and the aqueous layer is separated and washed twice with 10 parts by volume of benzene. The three benzene layers are combined and concentrated first under a partial vacuum and then under a pressure of 0.2 mm. Hg. at a temperature up to 110° C. There are obtained 27 parts of a viscous, dark resin containing 5.4 epoxide equivalents per kilogram and consisting predominantly of the diepoxide of the formula

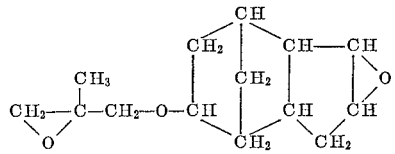

What is claimed is:
The monoepoxide of the formula

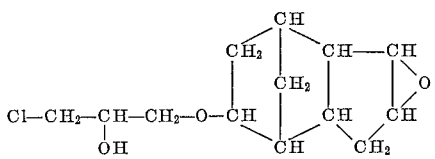

References Cited by the Examiner

UNITED STATES PATENTS

| | | | |
| --- | --- | --- | --- |
| 2,314,039 | 3/43 | Evans et al. | 260—348 |
| 2,543,419 | 2/51 | Niederhauser | 260—348 |
| 2,765,296 | 10/56 | Strain | 260—348.6 XR |
| 2,786,067 | 3/57 | Frostick et al. | 260—348 |

OTHER REFERENCES

Becco Bulletin, No. 69, Food Mahinery and Chemical Corp., October 1955, page 42.

WALTER A. MODANCE, *Primary Examiner.*

IRVING MARCUS, *Examiner.*